APPARATUS FOR POSITIONING MAGNETIC RECORD MEMBER

Original Filed May 31, 1966

INVENTORS:
HAROLD W. ABBOTT,
WILLIAM R. CHYNOWETH,

BY [signature]
THEIR ATTORNEY.

United States Patent Office 3,562,727

Patented Feb. 9, 1971

3,562,727
APPARATUS FOR POSITIONING MAGNETIC RECORD MEMBER

Harold W. Abbott, Syracuse, N.Y., and William R. Chynoweth, Phoenix, Ariz., assignors to General Electric Company, a corporation of New York

Continuation of application Ser. No. 553,849, May 31, 1966. This application Sept. 25, 1969, Ser. No. 861,203
Int. Cl. G11b *5/80, 17/04*
U.S. Cl. 340—174.1 4 Claims

ABSTRACT OF THE DISCLOSURE

A planar magnetic medium is inserted between transducers and a base plate with the recording surface at a fixed spacing from the transducers. A pair of orthogonally disposed edge guides act to approximately position the medium as it is inserted. A solenoid actuated locating pin is mounted behind the base plate, centered on the axis of rotation of the transducers. The solenoid is actuated so as to thrust the pin through the base plate and through a locating hole that is provided in the record medium.

This is a continuation of application Ser. No. 553,849 filed on May 31, 1966 and now abandoned.

The invention relates, generally, to magnetic recording devices of the type which are of a relatively simple design and inexpensive fabrication. It has particular application to information processing systems and equipments wherein devices of this type are employed for entering into the system digital information that has been stored on individual recording media such as magnetically treated cards, tags, etc. More specifically, the invention relates to a novel magnetic recording device, and to novel recording media for use therewith, wherein information is magnetically recorded on circular tracks and there are provided means for precisely aligning the recording media with respect to the recording device in a simple manner substantially independent of the size and configuration of the media.

In the present state of the art, information is entered into computer systems and the like by such conventional means as punch cards, punch tapes and magnetic tapes. In general, magnetic storage media allow a higher stored information density and greater flexibility with respect to stored information format than do punch cards and punch tapes. In addition, there is essentially no wear of mechanical parts and no debris created that can foul the recording mechanism, as there is with respect to the punch type storage media. However, where ready access to individual blocks of stored information is required, punch cards are at present most commonly employed in preference to storage tapes since they are inherently better suited than the latter to satisfy such requirement.

Cards treated with magnetic material, which potentially incorporate all of the above-noted advantages of storage, have not been commonly employed because they normally require for the record and readout process complex scanning mechanisms. To eliminate the scanning problem, there has been recently developed a magnetic recording device employing magnetically coated cards in which a plurality of the recording heads are rotated relative to the recording medium, information being written upon concentric circular tracks.

Although there may be a requirement for additional recording heads, if a careful alignment is made between the recording medium and the recording heads, the circular scan eliminates the necessity for complex scanning mechanisms. Further, in instances where only a limited amount of recorded information is required, so that perhaps only one or two circular recording channels need be made, the additional complexity with respect to adding recording heads is minimal.

It is of utmost importance that for a circular scan arrangement, the recording media be precisely aligned within the recording apparatus. Prior to the present invention, such precise alignment had not been accomplished in an effective manner.

It is accordingly an object of the present invention to provide a novel magnetic recording device employing card type magnetic recording media, which device is of a simple construction and inexpensive fabrication and does not require a complex scanning mechanism.

It is a further object of the invention to provide a novel magnetic recording device employing card type magnetic recording media wherein information is recorded upon concentric circular tracks by rotating read-record heads, which device includes means for precisely aligning the recording media with respect to said read-record heads so that information can be readily recorded on and read out from said recording media.

It is a further object of the invention to provide a novel recording device, as above described, which is suited for accommodating magnetic recording media in the form of cards, tags and the like, that need not be of a uniform size or configuration.

Briefly, these and other objects of the invention are accomplished in a magnetic recording device which includes one or more rotatable read-record heads positioned opposite a base plate. A planar magnetic recording medium, normally in the form of a magnetically treated card or tag, is inserted between said read-record heads and base plate with the recording surface at a fixed spacing from said heads. A pair of orthogonally disposed edge guide means act to approximately position the card or tag as it is inserted into the recording device. A solenoid actuated locating pin is mounted behind the base plate, centered on the axis of rotation of said read-record heads. Upon insertion of the recording medium and approximate positioning thereof, the solenoid is actuated so as to thrust the pin through the base plate and through a locating hole that is provided in the recording medium. In addition, the read-record heads are caused to rotate and thereby circularly scan the recording surface. The locating pin, together with the edge guide means, provides a precise alignment of the recording medium with respect to the read-record heads. Further, the pin engages the base plate so as to cause it to pressure lock the recording medium in its aligned position.

The specification concludes with claims particularly pointed out and distinctly claiming the subject matter which is regarded as the invention. It is believed, however, that both as to its organization and method of operation, together with further objects and advantages thereof, the invention may be best understood from the following description taken in connection with the accompanying drawings in which:

Figures 1, 3:
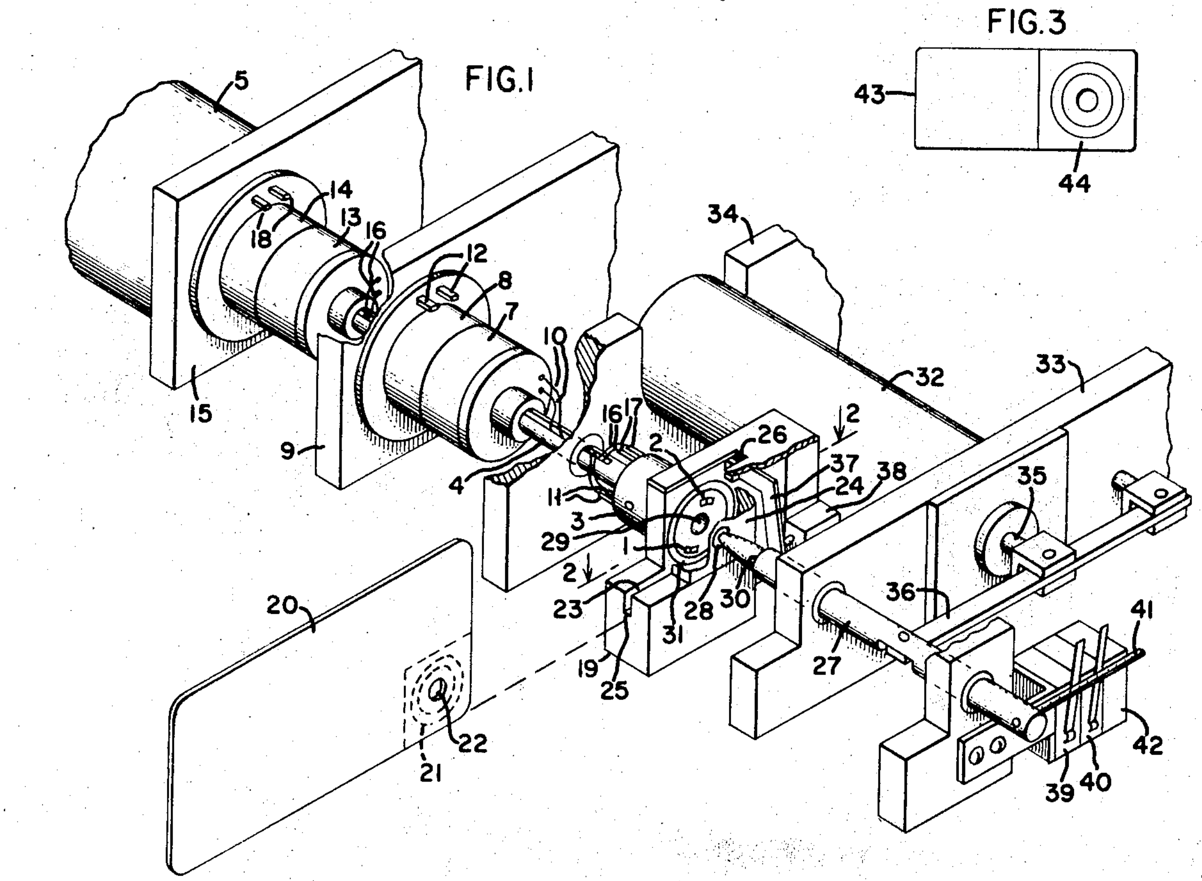
FIG. 1 is a perspective view of the magnetic recording device of the present invention.
FIG. 3 shows a second form of recording medium that may be employed with the recording device of the invention.

Referring now to FIG. 1, there is illustrated, in accordance with the invention, a perspective view of one operable embodiment of a magnetic recording device which performs both record and readout functions. The principal use of the illustrated device is for recording information on card type magnetic recording media for providing storage of said information, and subsequently reading out the information for the purpose of entering same into information processing equipments of various kinds.

The device is shown to include two read-record heads 1 and 2, each having a pair of magnetic pole pieces, encased in a head supporting structure 3 that is secured to a rotatable shaft 4. Read-record head 1 is located to the outside of head 2. The shaft 4 is rotated by a synchronous motor 5. Also secured to shaft 4 is the rotor 7 of a first, conventional cup core transformer, which also includes a stator 8 fixedly supported by a mounting bracket 9. The windings of rotor 7 (not shown in FIG. 1) are connected by a pair of wires 10 to terminals 11 of read-record head 1. A pair of terminals 12 are connected to the windings of stator 9 (not shown in FIG. 1) for providing signal coupling to and from the read-record head 1. Finally, there is fixed to shaft 4 the rotor 13 of a second, conventional cup core transformer, the stator 14 of which is fixedly mounted to a mounting bracket 15. Rotor 13 is connected by a pair of wires 16 to the terminals 17 of read-record head 2. A pair of terminals 18 are connected to stator 14 for providing signal access to the read-record head 2.

The head supporting structure 3 is made to rotate within an opening in a bracket 19 which bracket accommodates insertion of a recording medium, shown in FIG. 1 in the form of a rectangular card 20. The card is typically composed of an inexpensive fibrous material, such as cardboard or a plastic coated cardboard. By conventional fabrication techniques, a magnetic recording surface is formed on a confined area of one surface of the card, shown by the area 21. The magnetic material is typically iron oxide deposited, e.g., by a coating or laminating process, to a thickness of a few mils. Where a plastic coating is employed, the magnetic recording surface may be formed either underneath or on top of the plastic layer. An aperture 22 is provided at approximately the center of the recording surface. The remaining surface area of the card is available for printed and photographic matter, etc.

The recording surface 21 has a fixed, predetermined spatial relationship with respect to at least two adjacent edges of the recording medium, and preferably borders said edges as illustrated. As will be seen, such construction makes possible a proper alignment of the recording surface within the device, essentially independent of the size and configuration of the recording medium.

The bracket 19 includes a narrow slit 23 in which the card 20 is inserted so that, when fully inserted, the portion of the card containing the magnetic recording surface lies between the read-record heads 1 and 2 and an opposing pressure base plate 24. During insertion, the card is slid along an edge guide 25 until striking a stop member 26 attached to the bracket 19. In a fully assembled device, the stop member 26 is actually a part of a cover plate which encloses the recording device pictured. Upon insertion of the recording medium, the read-record heads 1 and 2 circularly scan the magnetic recording surface 21 so that the heads record on and read out (typically in a nondestructive manner) from concentric circular tracks on said recording surface. The magnetic record and read-out processes, per se, are standard and need not be further described.

The edge guide 25 and stop member 26 provide an approximate alignment of the card 20 within the recording device during insertion thereof. A precise alignment of the card is attained by means of a locating pin 27 which, upon full insertion of the recording medium, is thrust forward through an aperture 28 in the pressure base plate 24 and through the aperture 22 in the recording medium 20, forming a tight fit with the aperture 22. A cavity 29 is provided in the head supporting structure 3 for receiving the end of pin 27 when it is in its actuated position. The pin 27 is provided with a shoulder 30 which engages the pressure plate 24. As the pin enters the opening 22, the shoulder 30 causes the plate to squeeze the card against a spacing ring 31 which encircles the read-record heads so as to maintain a fixed spacing between said heads and the recording surface 21. The position of the card 20, as secured in the recording device by the pressure plate 24 and locating pin 27, is clearly shown in the cross sectional view of FIG. 2. A typical spacing provided between the recording heads and recording surface is several mils.

Locating pin 27, in its actuated position, is fixedly spaced with respect to the path of travel of the read-record heads 1 and 2. It is preferable that the longitudinal axis of the pin 27 precisely coincide with the axis of rotation of the read-record heads, in which case the aperture provided in the recording medium is precisely at the center of the circular tracks formed thereon. For such construction the angular position of the recording medium within the recording apparatus is not critical with respect to the heads providing an accurate scan.

Figure 2:
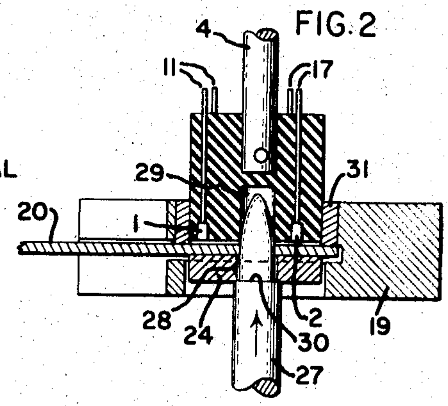
FIG. 2 is a cross sectional view of the device shown in FIG. 1 taken along the plane 2—2.

Locating pin 27 is forced under spring action or by other suitable means into its withdrawn position, shown in FIG. 1. Under the control of solenoid 32, the locating pin 27 is moved to its forward or actuated position, as illustrated in FIG. 2. The solenoid 32 which is supported by mounting brackets 33 and 34 has a central shaft 35 coupled by a mechanical linkage 36 to the locating pin 27 for actuating said pin. The actuating arm 37 of a microswitch 38 is positioned adjacent to stop member 26 so that the switch becomes actuated upon the recording medium being fully inserted. Actuation of microswitch 38 energizes the solenoid 32, as will be seen more clearly when considering the electrical circuit of FIG. 4. A pair of microswitches 39 and 40 are actuated by a rod member 41 attached to locating pin 27, upon movement of pin 27 to its forward position. Switches 39 and 40 serve, respectively, to energize the motor 5 and to provide a hold function for the solenoid 32. An electrical relay 42 is attached to the housing of switch 40. Upon completion of a single record or read sequence, a release signal is applied to relay 42, the actuation of which interrupts energization of solenoid 32 and causes return of the locating pin 27 to its withdrawn position.

The above discussion has been directed to a recording medium specifically in the form of a card having the magnetic recording surface at one corner of one surface thereof. However, use of the described alignment technique allows recording media of many different dimensions and configurations to be employed with the present recording device, it being required only that the magnetic recording surface be of approximately uniform dimensions and that it generally border two adjacent edges of the recording media. In FIG. 3, there is illustrated a recording medium in the form of a tag 43 which may also be readily employed with the described recording device. For this medium the magnetic recording surface 44 covers approximately one half of a single tag surface.

Figure 4:
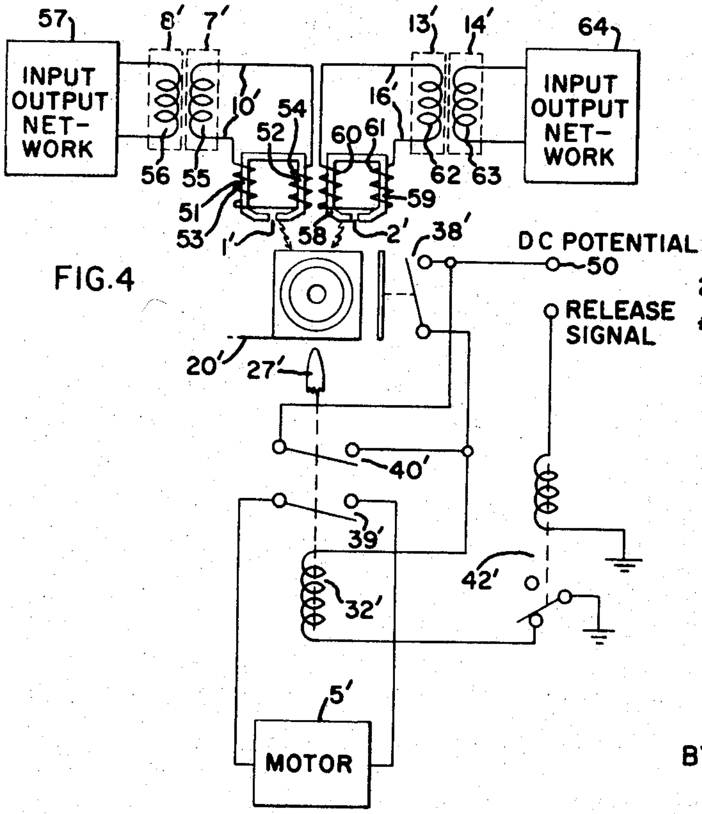
FIG. 4 is a schematic diagram of the electrical connections made to the recording device shown in FIGS. 1 and 2.

The electrical circuit of the recording device of FIG. 1 is schematically illustrated in FIG. 4. Those components which correspond to components included in FIG. 1 are provided with similar identifying reference characters, but with an added prime notation. With reference to FIG. 4, upon the recording medium 20′ being fully inserted into the recording device it causes the microswitch 38′ to close. A D.C. potential is then applied from terminal 50 through switch 38′ to the solenoid 32′, the circuit being completed to ground through the contacts 42′, which is in its unenergized state. Energization of solenoid 32′ causes locating pin 27′ to move to its forward position, thereby precisely aligning the recording medium and fixing said alignment, as above described. In response to energization of solenoid 32′, the contacts of switches 39′ and 40′ are closed. Closure of switch 39′ causes energization of motor 5' which commences rotation of the recording heads 1' and 2'. Closure of switch 40' completes a D.C. path from terminal 50 through solenoid 32' to ground which maintains the solenoid 32' in its energized state irrespective of whether microswitch 38' remains closed.

Read-record head 1' includes a pair of magnetic pole shoes 51 and 52 which have serially adding signal windings 53 and 54, respectively, wound thereabout. Windings 53 and 54 are connected by conductors 10' to winding 55 of the rotor 7'. Inductively coupled to winding 55 is winding 56 of stator 8', winding 56 being connected to a first input-output network 57. In a comparable manner, read-record head 2' includes a pair of magnetic pole shoes 58 and 59 having serially adding signal windings 60 and 61, respectively, coupled by conductors 16' to winding 62 of rotor 13'. Winding 63 of stator 14' is connected to a second input-output network 64.

Input-output means 57 and 64 are shown in block form since they do not form an actual part of the present invention. The networks may each include conventional amplifier circuitry, gating means, connecting means, as well as other conventional components that may be necessary for applying electrical signals to and receiving signals from the illustrated recording device. Thus, during the record sequence, network 57 applies an electrical signal to read-record head 1' for recording by the recording medium along an outer circular track, and network 64 applies an electrical signal to recording head 2' for recording along an inner track. During readout, read-record head 1' scans the outer circular track and head 2' scans the inner track for inducing electrical signals that may be obtained from networks 57 and 64, respectively.

During the record operation, start and stop signals are recorded at the beginning and end of each data sequence. The start and stop signals make it clear in the output circuit at what point the recorded data sequence begins and at what point it terminates. Thus, during readout the recorded data can be readily identified, and an accurate angular alignment between the position of the read-record heads and the recorded data is not required. Upon completion of each of the record cycle and the read cycles, as the case may be, there is generated a release signal. This may be readily provided by one or both of the input-output networks. The release signal energizes the relay 42', the contacts of which break the ground connection for solenoid 32'. Upon solenoid 32' becoming deenergized, the locating pin 27' is retracted, allowing the recording medium to be removed. Further, the motor 5' is deenergized and the hold contact 40' is opened.

In one operable embodiment of the described recording device the synchronous motor 5 rotates the shaft 4 at 1800 r.p.m. The read-record heads 1 and 2 are embedded in a potting compound such as Hypsol, a trademark of Houghton Laboratories, Inc., and scan circular tracks with diameters of .55 inch and .35 inch, respectively. The head pole pieces have a width of about 25 mils, which establishes the width of the circular tracks. The pole pieces have 125 turns wound about each leg. The gap spacing between pole pieces is about five mils and the spacing between the read-record heads and the recording surface about three to five mils. The rotary transformers include Allen-Bradley cup cores the faces of which have been turned down so as to provide a constant gap between the rotor and stator, which gap is a few mils.

One operable embodiment of the invention has been described in considerable detail for the purpose of complete and clear disclosure. However, it is not intended that the invention be limited to such disclosed details. Rather it is recognized that numerous modifications and changes may be made to the described device which do not exceed the basic invention herein taught, and the invention is intended to include all such modifications and changes. In particular, although the description is directed to a magnetic recording device and magnetic recording medium, and at present is contemplated as having greatest utility for such application, the broad concepts of the invention are recognized as also applicable to other types of recording devices, e.g., electrostatic or optical recording devices and media.

The appended claims, therefore, are intended to include within their meaning all modifications and variations that fall within the true scope of the invention.

What is claimed is:

1. An information handling device comprising:

means for receiving and initially positioning a flat member such as a card or the like having a layer of magnetic material and an opening extending through the magnetic layer;

a support member mounted for rotation about a fixed axis, said support member having a planar end surface normal to said axis;

means for precisely positioning the flat member, said precise positioning means comprising:

- a ring coaxially surrounding said support member, said ring having a planar end surface in approximate axial alignment with the end surface of said support member,
- a pin coaxially disposed on said axis for entering the opening in the flat member, said pin being dimensioned to snugly engage a predetermined size and shape of opening in the flat member,
- and a pressure plate for biasing the flat member axially against the planar end surface of said ring;

and a read-record head carried by said support member at the planar end surface thereof and at a fixed radius from said axis;

whereby rotation of said support member will cause said read-record head to follow a circular path and whereby said precise positioning means will assure accurate and repeatable positioning of the flat member and its magnetic layer relative to said read-record head and a circular path generated by said head.

2. An information handling device as defined by claim 1 further comprising a plurality of read-record heads carried by said support member at a plurality of fixed radii from said axis.

3. An information handling device as defined by claim 2 further comprising means responsive to a release signal for releasing the flat member from said precise positioning means and thereby permitting its withdrawal from said initial positioning means.

4. An information handling device as defined by claim 3 wherein said releasing means is responsive to a stop signal recorded on the magnetic layer and read by said read-record head.

References Cited

UNITED STATES PATENTS

| | | | |
|---|---|---|---|
| 2,914,746 | 11/1959 | James | 179—100.2 |
| 3,025,011 | 3/1962 | Camras | 179—100.2 |
| 3,195,118 | 7/1965 | St. Clair | 340—174.1 |
| 3,348,213 | 10/1967 | Evans | 340—174.1 |
| 3,349,385 | 10/1967 | Studley | 179—100.2 |

BERNARD KONICK, Primary Examiner

V. P. CANNEY, Assistant Examiner

U.S. Cl. X.R.

235—61.11